United States Patent [19]
van Roessel

[11] Patent Number: 5,218,445
[45] Date of Patent: Jun. 8, 1993

[54] SYSTEM FOR FOCUSING A TELEVISION CAMERA OBJECTIVE LENS

[75] Inventor: Frederik J. van Roessel, Upper Saddle River, N.J.

[73] Assignee: BTS Broadcast Television Systems GmbH, Darmstadt, Fed. Rep. of Germany

[21] Appl. No.: 604,972

[22] Filed: Oct. 26, 1990

[30] Foreign Application Priority Data

Nov. 21, 1989 [DE] Fed. Rep. of Germany ....... 3938522

[51] Int. Cl.$^5$ ............................................. H04N 5/232
[52] U.S. Cl. ...................... 358/227; 354/402
[58] Field of Search .............. 358/227, 228; 354/402, 354/400, 403, 406

[56] References Cited

U.S. PATENT DOCUMENTS

| | | | |
|---|---|---|---|
| 4,638,364 | 1/1987 | Hiramatsu | 358/227 |
| 4,695,893 | 9/1987 | Makino et al. | 354/403 |
| 4,804,831 | 2/1989 | Baba et al. | 358/227 |
| 4,967,279 | 10/1990 | Murashima | 354/402 |
| 4,975,726 | 12/1990 | Kuga et al. | 354/402 |

OTHER PUBLICATIONS

"The Computer as a Camera-Operation and Image-Quality Manager", by Frederik J. van Roessel and Engbert Tienkamp, pp. 1079-1086.

Primary Examiner—James J. Groody
Assistant Examiner—Glenton B. Burgess
Attorney, Agent, or Firm—Frishauf, Holtz, Goodman & Woodward

[57] ABSTRACT

A system for focusing a zoom lens objective of a color television camera. A luminance or green video signal derived from a portion of the picture is full-wave rectified and then averaged. The sharpest focus corresponds to the highest value of that average. The signal is converted to digital form and processed by a microcomputer for automatic focusing control by finding the signal maximum with shifting of the lens focus setting. The video signal is stripped of its d.c. component before rectification, but is used with its full bandwidth.

5 Claims, 2 Drawing Sheets

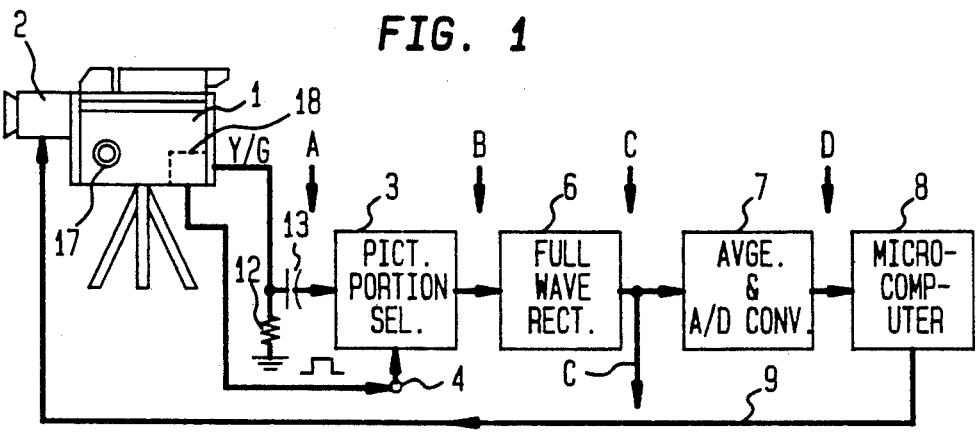
FIG. 1
FIG. 2B
FIG. 2C
FIG. 2A
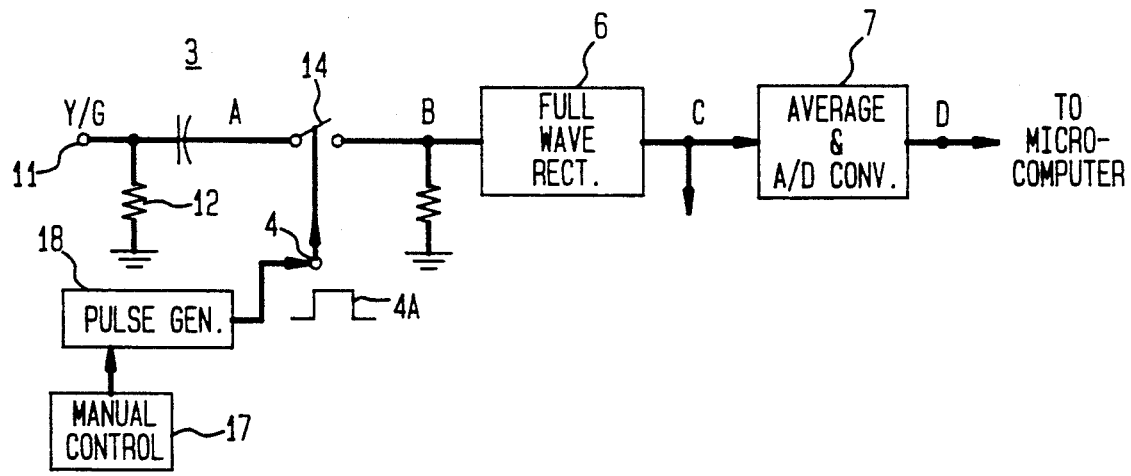
FIG. 3A
FIG. 3B

SYSTEM FOR FOCUSING A TELEVISION CAMERA OBJECTIVE LENS

This invention concerns the focusing of a television camera objective, which is typically a zoom lens equipped with lens shifting means for focus, by a system in which a focus signal derived from a video signal is generated by rectification or absolute value formation followed by averaging of a video signal relating to a region of a television picture. The focus signal so derived is digitalized and processed in a microcomputer programmed for shifting the lens, comparing focus status values and deriving control signals for optimizing the focus status.

Such an automatic focusing circuit for a television camera is disclosed in U.S. Pat. No. 4,638,364. In this case the luminance component of the video signal is passed through a high-pass filter for deriving the focus signal, so that only the high-frequeny components of the luminance signal contribute to the generation of the focus signal.

A similar provision for carrying out focus correction is known from the adjustment system of a television camera disclosed in European Patent 0 084 908 B1. Here also only the higher frequency components of the video signal are measured and are set at a maximum value for seeking the best focus.

If only the higher frequency components of this video signal are used for measuring the sharpness of the picture, however, the objective positioning may indeed lie close to the actual focus position, but this point of actual focus cannot be readily found by the automatic means described in the above references. There is a further disadvantage in those systems that the objective cannot be focused with reference to horizontal lines, because these vertical transitions have no high frequency components of the video signal in the neighborhood of the actually focussed condition.

SUMMARY OF THE INVENTION

It is an object of the present invention to provide automatic focusing of a television camera in which, for practically every possible setting, of, a zoom lens objective an optimal focusing can be obtained in the shortest time.

Briefly, the video signal from which the focus signal is derived is the d.c.-free luminance or green signal of the camera and it is utilized with full bandwidth. The system of the invention has the advantage that even video signals generated far from the actual focussed point can be used to derive information signals for automatic focussing of the objective. There is a further advantage that the objective can also be focussed with reference to horizontal lines, i.e. vertical transitions.

The portion of the picture in which the video signal used for focusing is derived can be made manually selectable and for this purpose the selection of the picture portion for generating the focus signal can utilize a gate that is open during the time the video signal relates to that picture portion.

The above-mentioned gate can be located in circuit just before or just after the rectifying circuit of the video signal processing.

BRIEF DESCRIPTION OF THE DRAWINGS

The invention is further described by way of illustrative example with reference to the annexed drawings, in which:

FIG. 1 is a circuit block diagram of a system of the invention;

FIG. 2A is a somewhat more detailed circuit block diagram of the mid-portion of the diagram of FIG. 1.

FIG. 2B is a graphical representation of a signal at poing B of FIG. 2A;

FIG. 2C is a graphical representation of a signal at point C of FIG. 2A;

FIG. 3A is a time-amplitude diagram of output signals of the full wave rectifier of FIG. 2 before the focusing adjustment has been found;

FIG. 3B is a time-amplitude diagram of the output signal of the full wave rectifier of FIG. 2 after the focus adjustment has been found;

DESCRIPTION OF THE ILLUSTRATED EMBODIMENT

Figure 4:
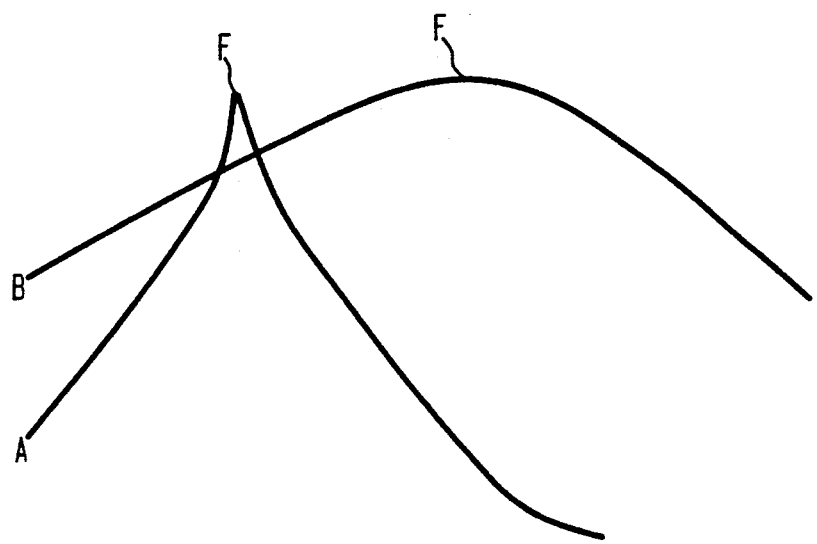
FIG. 4 are two typical sharpness curves of a zoom lens television camera objective, with axial position of the objective as the horizontal variable.

In the circuit block diagram of FIG. 1 the luminance signal Y or the green signal G of a video signal is obtained from the television camera 1 having a zoom-lens 2, and is supplied to a region selecting circuit 3 through a filter 12, 13, which converts the Y or G video signal into a d.c.-free video signal without appreciably limiting its bandwidth.

A so-called cursor pulse signal is supplied at the terminal 4 of the selection circuit 3. The cursor pulse signal defines a manually selected portion of the picture in which the picture sharpness is to be measured. It operates a switch 14 as shown in FIG. 2A for time-wise limiting of the signal passing through the switch so that only that part of the signal relating to the selected picture region will be passed on. The size and position of this picture region can be selected, for example, by the camera operator, by a manual control 17 and a time gate signal generator 18. Manually controlled cursor signals for selecting picture areas are well known and do not need to be further described here.

The video signal of the selected picture portion is then supplied to a full wave rectifier circuit 6 at the output of which the rectified video signal is made available during the intervals in which the selected picture portion is being scanned by the camera. This signal is then supplied to a measurement circuit 7 in which the amplitude of the average value of the rectified video signal is produced and converted into a digital signal, for example a 12-bit signal.

The measurement result is then utilized to determine the picture sharpness for the focus adjustment. For that purpose the digital signal is supplied to a microcomputer 8. The microcomputer 8 is programmed to provide a focus adjustment signal for the zoom lens 2 over the line or cable 9 for setting the optimal picture sharpness by control of the lens shifting device 10 with which the zoom lens 2 is equipped. The lens shifting device 10 is only symbolically shown in FIG. 1 because electronically controlled lens shifting devices for suitable for various kinds of automatic focus are well known. A common way of axially shifting an objective lens is by a screw or micrometer drive. The connection 9 may include a conductor for reporting the position of the objective lens to the microcomputer 8.

The processing of the digital measurement signal for generating the focus signal in the microcomputer 8 is of the kind disclosed in the above-mentioned European patent document Ep 0 084 908 B1 or of the kind disclosed in the article "The Computer as a Camera-Operation and Image-Quality Manager" by F. J. van Roessel and E. Tienkamp in SMPTE Journal, November, 1987, page 1079ff. These publications describe such programming in so great detail that it is not necessary to describe that subject matter further here.

In FIG. 2A a portion of the system of FIG. 1 according to the invention is shown in somewhat more detail, and the same parts that appear in FIGS. 1 and 2A are designated with the same reference numerals. In FIG. 2A the video signal Y or G is present at the terminal 11 and is supplied through a resistance-capacitance network 12, 13 to a switch 14. The numeral 3 in FIG. 2A identifies a switch 14 and the resistor 15 as the picture region selection circuit 3 of FIG. 1. The capacitor 13 eliminates the d.c. component of the video signal The cursor pulse signal supplied to the switch 14 from the terminal 4 closes the switch 14, when it has positive amplitude and thereby allows the further conduction of the video signal, now stripped of its d.c. component, past the circuit point B to the full wave rectifier 6. In the absence of the positive cursor pulse the switch 14 is open and a d.c. voltage of 0 volt is present at the input of the full wave rectifier, as assured by the input resistance 15 connected to ground. The cursor pulse is symbolized by the wave shape 4A below the terminal 4 in FIG. 2A. It operates a switch 14 and thus defines a time-wise limiting of the Y or G video signal supplied to the circuit point B and shown in FIG. 2B. By so doing it likewise provides a time-wise limiting of the signal produced by the full wave rectifier 6, as shown in FIG. 2C which is supplied to the averaging and digitizing unit 7. FIG. 2B shows a voltage-time graph of a typical signal at point B of FIG. 2A. In FIG. 2B a horizontal line during the open period of the switch 14 is labelled 0V to designate the 0 voltage level. The signal at C at the output of the full wave rectifier 6 can be used to highlight the selected picture portion on a local monitor or in the camera's electronic finder. This is indicated by the branching connection 16 in FIG. 2C.

After full-wave rectification of this signal present at point B there is produced at the circuit point C at the output of the full wave rectifier 6 a video signal having the signal course illustrated in FIG. 2C. The average value of this signal at circuit point C is a measure for the picture sharpness set by the position of the shifting device of the lens 2. The video signal at point C, as mentioned above, is converted from analog to digital form for a very large dynamic range in the measurement circuit 7. The resulting 12 bit measurement output signal is then supplied to the microcomputer 8 and there further processed. Details of this video signal processing can, as mentioned above, be found in the above-mentioned article by van Roessel and Tienkamp.

It will now be explained, by reference to FIGS. 3A and 3B, how the signal average value produced in the measurement circuit 7 before analog to digital conversion provides a measure for the picture sharpness. Both FIGS. 3A and 3B show the course of a full-wave rectified video signal at point C that is produced by scanning an alternating succession of black and white areas. The signal of FIG. 3A has rounded edges and oblique flanks, because the lens was not focussed on the test pattern. In contrast thereto the signal of FIG. 3B resulting from optimal focusing on the test picture has steep flanks and unrounded corners. It is thus easily visible that the average value of the signal of FIG. 3B is greater than that of the signal of FIG. 3A. The principle of this measurement system, however, is not limited to the use of any particular kind of test picture. It can also be used, advantageously, for focusing on a picture of normal picture content.

FIG. 4 shows two typical curves of the degree of sharpness as a function of the focus position of the objective lens. Curve A illustrates camera exposure to a scene with a telephoto setting (small picture angle) of a zoom lens and the curve B is generated with a wide angle setting of the zoom lens 2. In both cases the focus point F of the zoom lens 2 is readily recognizable.

Figure 5:
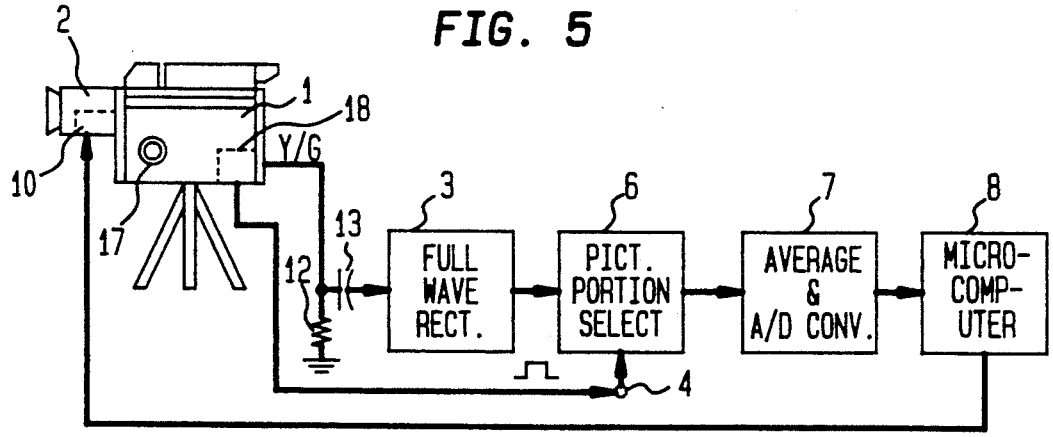
FIG. 5 is a diagram showing another embodiment of the invention differing from the embodiment of FIG. 1.

FIG. 5 is a diagram of a modification of FIG. 1 that has been mentioned already at the end of the Summary of the Invention. In FIG. 5 the gate 3 for time-wise allowing passage only of a video signal relating to the portion of the field of view that has been selected for focusing is located after the full wave rectifier 6 instead of before it, as shown in FIG. 1. It still precedes the averaging means 7.

The system of the invention can be used with particular advantage for high definition television (HDTV) cameras. With such cameras it is often difficult for the camera operator to focus a zoom lens objective optimally, because the picture reproduction on the picture screen of the electronic finder is not sharp enough. With use of the invention this disadvantage can be avoided if the rectified video signal at point C is supplied either to a monitor or to the electronic finder of the television camera 1 for manual focusing or, by pressing a button, supplied instead through the measurement circuit 7 to the microcomputer 8 for automatic focusing. Of course the system of the invention can also be used in conventional television cameras, whether in automatized studio operation or by retrofit into existing equipment to simplify the operation for the cameramen.

Although the invention has been described with reference to a particular illustrative example, it will be understood that variations and modifications are possible within the inventive concept.

I claim:
1. Apparatus for focusing a zoom-lens objective of a television camera having means for axially shifting said objective over a focusing position range, said shifting means having a control input for an electrical control signal, comprising:

electrical filter means, connected to a source of a luminance or green component of a video signal produced by said camera, for eliminating a d.c. component of said luminance or green component of said video signal and providing, at an output of said electrical filter means, the remainder of said luminance or green component of said video signal at its full bandwidth;

means, connected to said output of said d.c. component eliminating means, for full wave rectification of said full-bandwidth remainder of said luminance or green component of said video signal and for providing a rectified video signal at an output of aid rectification means;

means for averaging said rectified video signal component and means for converting successive average values thereof to digital signal values provided at an output of said averaging and converting means;

means for time-wise limiting the input to said means for averaging said rectified video signal to the rectification product of time-segments of said component remainder of said video signal which relate to a portion of a total field of view of said camera, said time-wise limiting means being interposed between said source of a luminance or green component of a video signal and said means for averaging said rectified video signal. and signal processing means connected to said output of said averaging and converting means and to said control input of said zoom-lens objective sifting means for producing said electrical control signal in response to said digital signal values so as to position said shifting means at a position at which said digital signal values show a maximum for said focusing position range.

2. The apparatus of claim 1, wherein said means for time-wise limiting the input to said averaging and converting means includes means for manually selecting a portion of a total field of view of said camera.

3. The apparatus of claim 2, wherein sad means for selecting said portion of a total field of view of said camera comprises means for generating cursor pulses defining the time intervals during which said portion of a total field of view of said camera is being scanned by said camera and wherein said means (14) for time-wise limiting the input to said averaging means is responsive to said cursor pulses for allowing passage through said time-wise limiting means of a video signal relating only to said portion of a total field of view of said camera.

4. The apparatus of claim 3, wherein said time-wise limiting means is interposed between an output of said means for eliminating any d.c. component of said luminance or green component of said video signal and an input of said means for full-wave rectification of said component of said video signal.

5. The apparatus of claim 3, wherein said time-wise limiting means is interposed between said output of said rectification means and an input of said averaging and converting means.

* * * * *